(12) United States Patent (10) Patent No.: US 8,314,708 B2
Gunderson et al. (45) Date of Patent: *Nov. 20, 2012

(54) SYSTEM AND METHOD FOR REDUCING DRIVING RISK WITH FORESIGHT

(75) Inventors: Charlie Gunderson, La Jolla, CA (US); Tom Lefleur, Rancho Santa Fe, CA (US); Doron Lurie, San Diego, CA (US); Bruce Moeller, San Diego, CA (US)

(73) Assignee: DriveCam, Inc., San Diego, CA (US)

( * ) Notice: Subject to any disclaimer, the term of this patent is extended or adjusted under 35 U.S.C. 154(b) by 257 days.

This patent is subject to a terminal disclaimer.

(21) Appl. No.: 11/382,239

(22) Filed: May 8, 2006

(65) Prior Publication Data

US 2007/0257804 A1 Nov. 8, 2007

(51) Int. Cl.
*G08B 23/00* (2006.01)
(52) U.S. Cl. .......................................... 340/576; 434/66
(58) Field of Classification Search .................. 340/576, 340/439; 701/1, 29, 35, 36, 70, 99, 116; 434/62–71; 348/148; 709/217, 219
See application file for complete search history.

(56) References Cited

U.S. PATENT DOCUMENTS

| | | | |
|---|---|---|---|
| 2,943,141 A | 6/1960 | Knight | |
| 3,634,866 A * | 1/1972 | Meyer | 340/901 |
| 3,781,824 A | 12/1973 | Caiati et al. | |
| 3,812,287 A | 5/1974 | Lemelson | |
| 3,885,090 A | 5/1975 | Rosenbaum | |
| 3,992,656 A | 11/1976 | Joy | |
| 4,054,752 A | 10/1977 | Dennis, Jr. et al. | |

(Continued)

FOREIGN PATENT DOCUMENTS

EP 1 355 278 A1 10/2003

(Continued)

OTHER PUBLICATIONS

International Search Report and Written Opinion issued in PCT/US07/68333 on Mar. 5, 2008.

(Continued)

*Primary Examiner* — Thomas Mullen
(74) *Attorney, Agent, or Firm* — Van Pelt, Yi & James LLP

(57) ABSTRACT

Systems and methods for the capture, analysis, and reporting of risky driver behavior are provided in combination with coaching of individual drivers to improve driver performance. The system comprises an event capture device that records both audio and video of an event. The event data, which includes the audio, video, and other related information, is provided to an evaluation server where it is then analyzed and scored and compiled with other event data. Event data can be compiled for individual drivers, groups of drivers, and the entire universe of drivers for an organization. The evaluation server provides managers, supervisors, and executives with access to reports including granular information about risky behavior and trends related to individual drivers, groups of drivers, or the entire universe of drivers for the organization. Additionally, the evaluation server provides coaching sessions for drivers (with or without their supervisors) to demonstrate to the driver with audio, video, and other related information (e.g., speed) how the event occurred and improved ways to avoid such an event in the future. In this fashion, driver improvement is achieved and insurance costs may be reduced for the organization.

21 Claims, 7 Drawing Sheets

U.S. PATENT DOCUMENTS

| | | | |
|---|---|---|---|
| 4,271,358 A | 6/1981 | Schwarz | |
| 4,280,151 A | 7/1981 | Tsunekawa et al. | |
| 4,281,354 A | 7/1981 | Conte | |
| 4,401,976 A | 8/1983 | Stadelmayr | |
| 4,409,670 A | 10/1983 | Herndon et al. | |
| 4,420,773 A | 12/1983 | Toyoda et al. | |
| 4,425,097 A * | 1/1984 | Owens | 434/66 |
| 4,456,931 A | 6/1984 | Toyoda et al. | |
| 4,489,351 A | 12/1984 | d'Alayer de Costemore d'Arc | |
| 4,496,995 A | 1/1985 | Colles et al. | |
| 4,500,868 A * | 2/1985 | Tokitsu et al. | 340/439 |
| 4,533,962 A | 8/1985 | Decker et al. | |
| 4,558,379 A | 12/1985 | Hutter et al. | |
| 4,593,313 A | 6/1986 | Nagasaki et al. | |
| 4,621,335 A | 11/1986 | Bluish et al. | |
| 4,625,210 A | 11/1986 | Sagl | |
| 4,630,110 A | 12/1986 | Cotton et al. | |
| 4,632,348 A | 12/1986 | Keesling et al. | |
| 4,638,289 A | 1/1987 | Zottnik | |
| 4,646,241 A | 2/1987 | Ratchford et al. | |
| 4,651,143 A | 3/1987 | Yamanaka | |
| 4,758,888 A | 7/1988 | Lapidot | |
| 4,763,745 A | 8/1988 | Eto et al. | |
| 4,785,474 A | 11/1988 | Bernstein et al. | |
| 4,789,904 A | 12/1988 | Peterson | |
| 4,794,566 A | 12/1988 | Richards et al. | |
| 4,804,937 A | 2/1989 | Barbiaux et al. | |
| 4,806,931 A | 2/1989 | Nelson | |
| 4,814,896 A * | 3/1989 | Heitzman et al. | 434/65 |
| 4,837,628 A | 6/1989 | Sasaki | |
| 4,839,631 A | 6/1989 | Tsuji | |
| 4,843,463 A | 6/1989 | Michetti | |
| 4,843,578 A | 6/1989 | Wade | |
| 4,876,597 A | 10/1989 | Roy et al. | |
| 4,883,349 A | 11/1989 | Mittelhauser | |
| 4,896,855 A | 1/1990 | Furnish | |
| 4,930,742 A | 6/1990 | Schofield et al. | |
| 4,936,533 A | 6/1990 | Adams et al. | |
| 4,939,652 A | 7/1990 | Steiner | |
| 4,942,464 A | 7/1990 | Milatz | |
| 4,945,244 A | 7/1990 | Castleman | |
| 4,949,186 A | 8/1990 | Peterson | |
| 4,980,913 A | 12/1990 | Skret | |
| 4,987,541 A | 1/1991 | Levente et al. | |
| 4,992,943 A | 2/1991 | McCracken | |
| 5,012,335 A | 4/1991 | Cohodar | |
| 5,027,104 A | 6/1991 | Reid | |
| 5,056,056 A | 10/1991 | Gustin | |
| 5,057,820 A | 10/1991 | Markson et al. | |
| 5,096,287 A | 3/1992 | Kakinami et al. | |
| 5,100,095 A | 3/1992 | Haan et al. | |
| 5,111,289 A | 5/1992 | Lucas et al. | |
| 5,140,434 A | 8/1992 | Van Blessinger et al. | |
| 5,140,436 A | 8/1992 | Blessinger | |
| 5,144,661 A | 9/1992 | Shamosh et al. | |
| 5,178,448 A | 1/1993 | Adams et al. | |
| 5,196,938 A | 3/1993 | Blessinger | |
| 5,223,844 A | 6/1993 | Mansell et al. | |
| 5,262,813 A | 11/1993 | Scharton | |
| 5,308,247 A | 5/1994 | Dyrdek | |
| 5,309,485 A | 5/1994 | Chao | |
| 5,311,197 A | 5/1994 | Sorden et al. | |
| 5,321,753 A | 6/1994 | Gritton | |
| 5,327,288 A | 7/1994 | Wellington et al. | |
| 5,330,149 A | 7/1994 | Haan et al. | |
| 5,343,527 A | 8/1994 | Moore | |
| 5,353,023 A | 10/1994 | Mitsugi | |
| 5,361,326 A | 11/1994 | Aparicio, IV et al. | |
| 5,387,926 A | 2/1995 | Bellan | |
| 5,388,045 A | 2/1995 | Kamiya et al. | |
| 5,404,330 A | 4/1995 | Lee et al. | |
| 5,408,330 A | 4/1995 | Squicciarini et al. | |
| 5,422,543 A | 6/1995 | Weinberg | |
| 5,430,431 A | 7/1995 | Nelson | |
| 5,430,432 A | 7/1995 | Camhi et al. | |
| 5,435,184 A | 7/1995 | Pineroli et al. | |
| 5,445,024 A | 8/1995 | Riley, Jr. et al. | |
| 5,445,027 A | 8/1995 | Zorner | |
| 5,446,659 A | 8/1995 | Yamawaki | |
| 5,455,625 A | 10/1995 | Englander | |
| 5,455,716 A | 10/1995 | Suman et al. | |
| 5,465,079 A * | 11/1995 | Bouchard et al. | 340/576 |
| 5,473,729 A | 12/1995 | Bryant et al. | |
| 5,477,141 A | 12/1995 | Nather et al. | |
| 5,495,242 A | 2/1996 | Kick et al. | |
| 5,497,419 A | 3/1996 | Hill | |
| 5,499,182 A | 3/1996 | Ousborne | |
| 5,504,482 A | 4/1996 | Schreder | |
| 5,515,285 A | 5/1996 | Garrett, Sr. et al. | |
| 5,521,633 A | 5/1996 | Nakajima et al. | |
| 5,523,811 A | 6/1996 | Wada et al. | |
| 5,526,269 A | 6/1996 | Ishibashi et al. | |
| 5,530,420 A | 6/1996 | Tsuchiya et al. | |
| 5,537,156 A | 7/1996 | Katayama | |
| 5,539,454 A | 7/1996 | Williams | |
| 5,541,590 A | 7/1996 | Nishio | |
| 5,544,060 A | 8/1996 | Fujii et al. | |
| 5,546,191 A | 8/1996 | Hibi et al. | |
| 5,546,305 A | 8/1996 | Kondo | |
| 5,548,273 A | 8/1996 | Nicol et al. | |
| 5,552,990 A | 9/1996 | Ihara et al. | |
| 5,559,496 A | 9/1996 | Dubats | |
| 5,568,211 A | 10/1996 | Bamford | |
| 5,570,127 A | 10/1996 | Schmidt | |
| 5,574,443 A | 11/1996 | Hsieh | |
| D376,571 S | 12/1996 | Kokat | |
| 5,581,464 A | 12/1996 | Woll et al. | |
| 5,590,948 A | 1/1997 | Moreno | |
| 5,596,382 A | 1/1997 | Bamford | |
| 5,600,775 A | 2/1997 | King et al. | |
| 5,610,580 A | 3/1997 | Lai | |
| 5,612,686 A | 3/1997 | Takano et al. | |
| 5,631,638 A | 5/1997 | Kaspar et al. | |
| 5,638,273 A | 6/1997 | Coiner et al. | |
| 5,642,106 A | 6/1997 | Hancock et al. | |
| 5,646,856 A | 7/1997 | Kaesser | |
| 5,652,706 A | 7/1997 | Morimoto et al. | |
| RE35,590 E | 8/1997 | Bezos et al. | |
| 5,654,892 A | 8/1997 | Fujii et al. | |
| 5,659,355 A | 8/1997 | Barron et al. | |
| 5,667,176 A | 9/1997 | Zamarripa et al. | |
| 5,669,698 A | 9/1997 | Veldman et al. | |
| 5,671,451 A | 9/1997 | Takahashi et al. | |
| 5,677,979 A | 10/1997 | Squicciarini et al. | |
| 5,680,117 A | 10/1997 | Arai et al. | |
| 5,680,123 A | 10/1997 | Lee | |
| 5,689,442 A | 11/1997 | Swanson et al. | |
| 5,696,705 A | 12/1997 | Zykan | |
| 5,706,362 A | 1/1998 | Yabe | |
| 5,712,679 A | 1/1998 | Coles | |
| 5,717,456 A | 2/1998 | Rudt et al. | |
| 5,719,554 A | 2/1998 | Gagnon | |
| 5,784,521 A | 7/1998 | Nakatani et al. | |
| 5,790,403 A | 8/1998 | Nakayama | |
| 5,790,973 A | 8/1998 | Blaker et al. | |
| 5,793,420 A | 8/1998 | Schmidt | |
| 5,794,165 A | 8/1998 | Minowa et al. | |
| 5,797,134 A | 8/1998 | McMillan et al. | |
| 5,798,458 A | 8/1998 | Monroe | |
| 5,800,040 A | 9/1998 | Santo | |
| 5,802,545 A | 9/1998 | Coverdill | |
| 5,802,727 A | 9/1998 | Blank et al. | |
| 5,815,093 A | 9/1998 | Kikinis | |
| 5,825,412 A | 10/1998 | Hobson et al. | |
| 5,844,505 A | 12/1998 | Van Ryzin | |
| 5,896,167 A | 4/1999 | Omae et al. | |
| 5,897,606 A | 4/1999 | Miura et al. | |
| 5,899,956 A | 5/1999 | Chan | |
| 5,901,806 A | 5/1999 | Takahashi | |
| 5,914,748 A | 6/1999 | Parulski et al. | |
| 5,926,210 A | 7/1999 | Hacket et al. | |
| 5,946,404 A | 8/1999 | Bakshi et al. | |
| 5,978,017 A | 11/1999 | Tino | |
| 6,002,326 A | 12/1999 | Turner | |
| 6,006,148 A | 12/1999 | Strong | |
| 6,008,723 A | 12/1999 | Yassan | |
| 6,008,841 A | 12/1999 | Charlson | |

| | | |
|---|---|---|
| 6,009,370 A | 12/1999 | Minowa et al. |
| 6,011,492 A | 1/2000 | Garesche |
| 6,028,528 A | 2/2000 | Lorenzetti et al. |
| 6,037,860 A | 3/2000 | Zander et al. |
| 6,037,977 A | 3/2000 | Peterson |
| 6,064,792 A | 5/2000 | Fox et al. |
| 6,092,193 A | 7/2000 | Loomis et al. |
| 6,122,738 A | 9/2000 | Millard |
| 6,141,611 A | 10/2000 | Mackey et al. |
| 6,144,296 A | 11/2000 | Ishida et al. |
| 6,151,065 A | 11/2000 | Steed et al. |
| 6,163,338 A | 12/2000 | Johnson et al. |
| 6,167,186 A | 12/2000 | Kawasaki et al. |
| 6,181,373 B1 | 1/2001 | Coles |
| 6,185,490 B1 | 2/2001 | Ferguson |
| 6,200,139 B1 * | 3/2001 | Clapper ............... 434/62 |
| 6,211,907 B1 | 4/2001 | Scaman et al. |
| 6,218,960 B1 | 4/2001 | Ishikawa et al. |
| 6,246,933 B1 | 6/2001 | Bague |
| 6,253,129 B1 | 6/2001 | Jenkins et al. |
| 6,337,622 B1 | 1/2002 | Sugano |
| 6,389,340 B1 | 5/2002 | Rayner |
| 6,405,112 B1 | 6/2002 | Rayner |
| 6,405,132 B1 | 6/2002 | Breed et al. |
| 6,408,232 B1 | 6/2002 | Cannon et al. |
| 6,449,540 B1 | 9/2002 | Rayner |
| 6,611,755 B1 | 8/2003 | Coffee et al. |
| 6,679,702 B1 * | 1/2004 | Rau ............... 434/62 |
| 6,714,894 B1 | 3/2004 | Tobey et al. |
| 6,718,239 B2 | 4/2004 | Rayner |
| 6,895,248 B1 | 5/2005 | Akyol et al. |
| 7,100,190 B2 | 8/2006 | Johnson et al. |
| 2001/0005804 A1 | 6/2001 | Rayner |
| 2002/0035422 A1 | 3/2002 | Sasaki |
| 2002/0059453 A1 | 5/2002 | Eriksson et al. |
| 2002/0111725 A1 | 8/2002 | Burge |
| 2002/0163532 A1 | 11/2002 | Thomas et al. |
| 2002/0169529 A1 | 11/2002 | Kim |
| 2003/0080878 A1 | 5/2003 | Kirmuss |
| 2003/0125854 A1 | 7/2003 | Kawasaki et al. |
| 2003/0144775 A1 | 7/2003 | Klausner |
| 2003/0154009 A1 | 8/2003 | Basir et al. |
| 2003/0158638 A1 | 8/2003 | Yakes et al. |
| 2003/0187704 A1 | 10/2003 | Hashiguchi et al. |
| 2003/0191568 A1 | 10/2003 | Breed |
| 2003/0214585 A1 | 11/2003 | Bakewell et al. |
| 2004/0039503 A1 | 2/2004 | Doyle |
| 2004/0103008 A1 | 5/2004 | Wahlbin et al. |
| 2004/0103010 A1 | 5/2004 | Wahlbin et al. |
| 2004/0209594 A1 | 10/2004 | Naboulsi |
| 2005/0021199 A1 | 1/2005 | Zimmerman et al. |
| 2005/0159964 A1 | 7/2005 | Sonnenrein et al. |
| 2005/0166258 A1 | 7/2005 | Vasilevsky et al. |
| 2005/0171692 A1 | 8/2005 | Hamblen et al. |
| 2005/0185936 A9 | 8/2005 | Lao et al. |
| 2005/0258942 A1 | 11/2005 | Manasseh et al. |
| 2006/0007151 A1 | 1/2006 | Ram |
| 2006/0015233 A1 | 1/2006 | Olsen et al. |
| 2006/0025897 A1 | 2/2006 | Shostak et al. |
| 2006/0040239 A1 | 2/2006 | Cummins et al. |
| 2006/0053038 A1 | 3/2006 | Warren et al. |
| 2006/0055521 A1 | 3/2006 | Blanco et al. |
| 2006/0057543 A1 * | 3/2006 | Roald ............... 434/62 |
| 2006/0078853 A1 * | 4/2006 | Lanktree ............... 434/62 |
| 2006/0092043 A1 | 5/2006 | Lagassey |
| 2006/0095175 A1 * | 5/2006 | deWaal et al. ............... 340/438 |
| 2006/0095349 A1 | 5/2006 | Morgan et al. |
| 2006/0212195 A1 | 9/2006 | Veith et al. |
| 2006/0242680 A1 | 10/2006 | Johnson et al. |
| 2007/0001831 A1 | 1/2007 | Raz et al. |
| 2007/0124332 A1 | 5/2007 | Ballesty et al. |
| 2007/0135979 A1 | 6/2007 | Plante |
| 2007/0136078 A1 | 6/2007 | Plante |
| 2007/0143499 A1 | 6/2007 | Chang |
| 2007/0150140 A1 | 6/2007 | Seymour |
| 2007/0241874 A1 | 10/2007 | Okpysh et al. |
| 2007/0260677 A1 | 11/2007 | DeMarco et al. |

FOREIGN PATENT DOCUMENTS

| | | |
|---|---|---|
| GB | 2 268 608 | 1/1994 |
| JP | 5-137144 | 6/1993 |
| JP | 5-294188 | 11/1993 |
| JP | 8-124069 | 5/1996 |
| JP | 10-076880 | 3/1998 |
| WO | WO 88/09023 | 11/1988 |
| WO | WO 90/05076 | 5/1990 |
| WO | WO 94/27844 | 12/1994 |
| WO | WO 96/00957 | 1/1996 |
| WO | WO 97/01246 | 1/1997 |
| WO | WO 99/37503 | 7/1999 |
| WO | WO 99/40545 | 8/1999 |
| WO | WO 99/62741 | 12/1999 |
| WO | WO 00/07150 | 2/2000 |
| WO | WO 00/48033 | 8/2000 |
| WO | WO 00/77620 | 12/2000 |
| WO | WO 01/25054 | 4/2001 |

OTHER PUBLICATIONS

Jean (DriveCam vendor), "DriveCam brochure", Nov. 6, 2002.
"The DriveCam", Nov. 6, 2002.
Jean (DriveCam vendor), "DC Data Sheet", Nov. 6, 2002.
"Driver Feedback System", Jun. 12, 2001.
Jean (DriveCam vendor), "Feedback Data Sheet", Nov. 6, 2002.
"Interior Camera Data Sheet", Oct. 26, 2001.
Jean (DriveCam vendor), "HindSight 20-20 Data Sheet", Nov. 4, 2002.
"DriveCam Driving Feedback System", Mar. 15, 2004.
Glenn Oster, "HindSight 20/20 v4.0 Software Installation", 1 of 2, Jun. 20, 2003.
Glenn Oster, "HindSight 20/20 v4.0 Software Installation", 2 of 2, Jun. 20, 2003.
Julie Stevens, "DriveCam Services", Nov. 15, 2004.
Julie Stevens, "Program Support Roll-Out & Monitoring", Jul. 13, 2004.
Jessyca Wallace, "The DriveCam Driver Feedback System", Apr. 6, 2004.
Karen, "Managers Guide to the DriveCam Driving Feedback System", Jul. 30, 2002.
Jessyca Wallace, "Analyzing and Processing DriveCam Recorded Events", Oct. 6, 2003.
Del Lisk, "DriveCam Training Handout Ver4", Feb. 3, 2005.
Jessyca Wallace, "Overview of the DriveCam Program", Dec. 15, 2005.
"DriveCam—Illuminator Data Sheet", Oct. 2, 2004.
Karen, "Downloading Options to HindSight 20/20", Aug. 6, 2002.
Bill, "DriveCam—FAQ", Dec. 12, 2003.
David Maher, "DriveCam Brochure Folder", Jun. 6, 2005.
"Passanger Transportation Mode Brochure", May 2, 2005.
Quinn Maughan, "DriveCam Unit Installation", Jul. 21, 2005.
Glenn Oster, "Illuminator Installation", Oct. 3, 2004.
Quinn Maughan, "HindSight Installation Guide", Sep. 29, 2005.
Quinn Maughan, "HindSight Users Guide", Jun. 20, 2005.
"World News Tonight", CBS Television New Program discussing teen drivers using the DriveCam Program and DriveCam Technology, Oct. 10, 2005, On PC formatted CD-R, World News Tonight. wmv, 7.02 MB, Created Jan. 12, 2011.
"World News Tonight", PBS Television New Program discussing teen drivers using the DriveCam Program and DriveCam Technology, Oct. 10, 2005, on PC formatted CD-R, Teens Behind the Wheel. wmv, 236 MB, Created Jan. 12, 2011.
Quinn Maughan, "Enterprise Services", Apr. 17, 2006.
Quinn Maughan, "DriveCam Enterprise Services", Jan. 5, 2006.
Quinn Maughan, "DriveCam Managed Services", Jan. 5, 2006.
Quinn Maughan, "DriveCam Standard Edition", Jan. 5, 2006.
Kathy Latus (Latus Design), "Case Study—Time Warner Cable", Sep. 23, 2005.
Kathy Latus (Latus Design), "Case Study—Cloud 9 Shuttle", Sep. 23, 2005.
Kathy Latus (Latus Design), "Case Study—Lloyd Pest Control", Jul. 19, 2005.

Bill Siuru, "DriveCam Could Save You Big Bucks", Land Line Magazine, May-Jun. 2000.
J. Gallagher, "Lancer Recommends Tech Tool", Insurance and Technology Magazine, Feb. 2002.
"Ambulance Companies Use Video Technology to Improve Driving Behavior", Ambulance Industry Journal, Spring 2003.
Lisa Mckenna, "A Fly on the Windshield?", Pest Control Technology Magazine, Apr. 2003.
Chris Woodyard, "Shuttles save with DriveCam", Dec. 9, 2003.
David Cullen, "Getting a real eyeful", Fleet Owner Magazine, Feb. 2002.
Ronnie Rittenberry, "Eyes on the Road", Jul. 2004.
"HindSight v4.0 Users Guide", DriveCam Video Systems, Apr. 25, 2005.
"Amended Complaint for Patent Infringement, Trade Secret Misappropriation, Unfair Competition and Conversion" in *DriveCam, Inc. v. SmartDrive Systems, Inc.*, Case No. 3:11-CV-00997-H-RBB, for the Southern District of California, Document 34, filed Oct. 20, 2011, pp. 1-15.
"Answer to Amended Complaint; Counterclaims; and Demand for Jury Trial" in *DriveCam, Inc. v. SmartDrive Systems, Inc.*, Case No. 3:11-CV-00997 H (RBB), for the Southern District of California, Document 47, filed Dec. 13, 2011, pp. 1-15.
"DriveCam, Inc's Disclosure of Responsive Constructions and Extrinsic Evidence Pursuant to Patent L.R. 4.1.c & 4.1d" in *DriveCam, Inc. v. SmartDrive Systems, Inc.*, Case No. 3:11-CV-00997-H-RBB, for the Southern District of California. Nov. 15, 2011.
"DriveCam's Disclosure of Asserted Claims and Preliminary Infringement Contentions" in *DriveCam, Inc. v. SmartDrive Systems, Inc.*, Case No. 3:11-CV-00997-H-RBB, for the Southern District of California. Aug. 19, 2011.
"First Amended Answer to Amended Complaint and First Amended Counterclaims; and Demand for Jury Trial" in *DriveCam, Inc. v. SmartDrive Systems, Inc.*, Case No. 3:11-CV-00997 H (RBB), for the Southern District of California, Document 55, filed Jan. 3, 2012, pp. 86-103.
"First Amended Answer to Amended Complaint and First Amended Counterclaims; and Demand for Jury Trial" in *DriveCam, Inc. v. SmartDrive Systems, Inc.*, Case No. 3:11-CV-00997 H (RBB), for the Southern District of California, Document 53, filed Dec. 20, 2011, pp. 1-48.
"Joint Claim Construction Chart" in *DriveCam, Inc. v. SmartDrive Systems, Inc.*, Case No. 11-CV-0997-H (RBB), for the Southern District of California, Document 43, filed Dec. 1, 2011, pp. 1-2.
"Joint Claim Construction Worksheet" in *DriveCam, Inc. v. SmartDrive Systems, Inc.*, Case No. 3:11-CV-00997 H (RBB), for the Southern District of California, Document 44, filed Dec. 1, 2011, pp. 1-2.
"Preliminary Claim Construction and Identification of Extrinsic Evidence of Defendant/Counterclaimant SmartDriveSystems, Inc." in *DriveCam, Inc. v. SmartDrive Systems, Inc.*, Case No. 3:11-CV-00997-H (RBB), for the Southern District of California. Nov. 8, 2011.
"Responsive Claim Construction and Identification of Extrinsic Evidence of Defendant/Counterclaimant SmartDrive Systems, Inc." in *DriveCam, Inc. v. SmartDrive Systems, Inc.*, Case No. 3:11-CV-00997-H (RBB), for the Southern District of California. Nov. 15, 2011.
"Supplement to DriveCam's Disclosure of Asserted Claims and Preliminary Infringement Contentions" in *DriveCam, Inc. v. SmartDrive Systems, Inc.*, Case No. 3:11-CV-00997-H-RBB, for the Southern District of California. Oct. 14, 2011.
U.S. Appl. No. 11/296,906, filed Dec. 8, 2005, File History.
U.S. Appl. No. 11/297,669, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
DriveCam Extrinsic Evidence with Patent LR 4.1.a Disclosures, Nov. 8, 2011.
DriveCam, Inc.'s Infringement Contentions Exhibit A, U.S. Patent 6,389,340. Aug. 11, 2011.
DriveCam, Inc.'s Infringement Contentions Exhibit B, U.S. Patent 7,659,827. Aug. 19, 2011.
DriveCam, Inc.'s Infringement Contentions Exhibit C, U.S. Patent 7,804,426. Aug. 19, 2011.
Drivecam.com as retrieved by the Internet Wayback Machine as of Mar. 5, 2005.
Joint Claim Construction Chart, U.S. Patent No. 6,389,340, "Vehicle Data Recorder" for Case No. 3:11-CV-00997-H-RBB, Document 43-1, filed Dec. 1, 2011, pp. 1-33.
Joint Claim Construction Worksheet, U.S. Patent No. 6,389,340, "Vehicle Data Reporter" for Case No. 3:11-CV-00997-H-RBB, Document 44-1, filed Dec. 1, 2011, pp. 1-10.
International Search Report and Written Opinion issued in PCT/US07/68325 on Feb. 27, 2008.
International Search Report and Written Opinion issued in PCT/US07/68332 on Mar. 3, 2008.
International Search Report and Written Opinion issued in PCT/US07/68334 on Mar. 5, 2008.
SmartDrives Systems, Inc.'s Production, S014246-S014255, Nov. 16, 2011.
International Search Report and Written Opinion issued in PCT/US07/68329 on Mar. 3, 2008.
International Search Report issued in PCT/US07/68328 on Oct. 15, 2007.
Written Opinion issued in PCT/US07/68328 on Oct. 15, 2007.
"DriveCam, Inc's Disclosure of Proposed Constructions and Extrinsic Evidence Pursuant to Patent L.R. 4.1.a & 4.1.b" in *DriveCam, Inc. v. SmartDrive Systems, Inc.*, Case No. 3:11-CV-00997-H-RBB, for the Southern District of California. Nov. 8, 2011.
Drivecam, Inc., User's Manual for Drivecam Video Systems' Hindsight 20/20 Software Version 4.0 (2003).
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
Panasonic Corporation, Video Cassette Recorder (VCR) Operating Instructions for Models No. PV-V4020/PV-V4520.
JVC Company of America, JVC Video Cassette Recorder HR-IP820U Instructions (1996).
Hans Fantel, Video; Search Methods Make a Difference in Picking VCR's, NY Times, Aug. 13, 1989.
Dan Carr, Flash Video template: Video Presentation with Navigation, Jan. 16, 2006.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Category_Code=coaching)., printed from site on Jan. 11, 2012.
GE published its VCR User's Guide for Model VG4255 in 1995.
Adaptec published and sold its VideoOh! DVD software USB 2.0 Edition in at least Jan. 24, 2003.
Traqmate GPS Data Acquisition's Traqmate Data Acquisition with Video Overlay system was used to create a video of a driving event on Oct. 2, 2005 (available at http://www.trackvision.net/phpBB2/viewtopic.php? t=51&sid=1184fbbcbe3be5c87ffa0f2ee6e2da76), printed from site on Jan. 11, 2012.
David Vogeleer et al., Macromedia Flash Professional 8UNLEASHED (Sams Oct. 12, 2005).

* cited by examiner

SYSTEM AND METHOD FOR REDUCING DRIVING RISK WITH FORESIGHT

The present application is a continuation-in-part of U.S. patent application Ser. No. 11/382,239, filed May 8, 2006, and is related to U.S. patent application Ser. Nos. 11/382,325 and 11/382,328, filed May 9, 2006, which is incorporated herein by reference in its entirety.

BACKGROUND

1. Field of the Invention

The present invention generally relates to computer assisted feedback for reducing driving risk and more specifically relates to the capture and analysis of driving events and coaching of fleet drivers to reduce risky driving behavior.

2. Related Art

Conventional systems for taking risk out of driving are non-existent or impractical today. The current state of the art for predicting the driving safety of individual drivers or groups of drivers operating vehicles under certain circumstances is primitive. Additionally, analysis of identified risky behavior is time consuming and requires a specific skill set not typically found within an organization having a fleet of motor vehicles. Furthermore, there are no systems in place today that can objectively analyze and score driving events to assess the risk of an individual driver or an individual vehicle. Accordingly, what is needed is an efficient system and method for capturing, analyzing, and assessing the risk associated with the driving performance of individual drivers and coaching those individual drivers and providing reports to managers and supervisors to reduce risky driving behaviors.

SUMMARY

The present invention provides a system and method for computer assisted capture of risky driving behavior and efficient analysis, reporting, and coaching in order to improve driver behavior. The system comprises an event capture device that records audio, video, and other information that collectively comprise an event. The event data, including the audio, video, and other related information, is provided to an evaluation server where it is analyzed and scored and compiled with other event data. Event data may be compiled for an individual driver, a team led by a particular manager, the entire company fleet, and other varied groups. The evaluation server provides managers, supervisors, and executives with access to reports including granular information about risky behavior and trends related to individual drivers, groups within the organization, or the entire organization. Additionally, the evaluation server may provide coaching sessions for drivers (with or without their supervisors) to demonstrate to the driver with audio, video, and other related information how the event occurred and improved ways to avoid such an event in the future. In this fashion, driver improvement is achieved and insurance costs may be reduced for the organization.

The present systems and methods may be provided to an organization in a turnkey solution that can be implemented entirely by the organization or as a complete service. Alternative mixes may also be provided, for example where the organization implements and maintains the event capture system and the expert analysis of events is provided as a service. Other variations may also be provided such as where coaching is also provided as a service. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for reducing driving risk that capture driving events and provide those events to an evaluation server where the events are analyzed and reported to management and also compiled into coaching sessions for individuals or groups of drivers to receive in order to demonstrate to them how to avoid risky behaviors while driving. For example, one method as disclosed herein allows for an event capture device to capture an event and send the event via a communication network to an evaluation server. The evaluation server allows an analyst to review the raw event data and create a coaching session directed toward future avoidance of the risky behavior that caused the event. Additionally, the evaluation server compiles reports regarding the events for particular drivers or groups of drivers. The reports are then provided to management by the evaluation server and the coaching sessions are provided to the individual drivers or groups of drivers to improve their future avoidance of risky driving behaviors.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
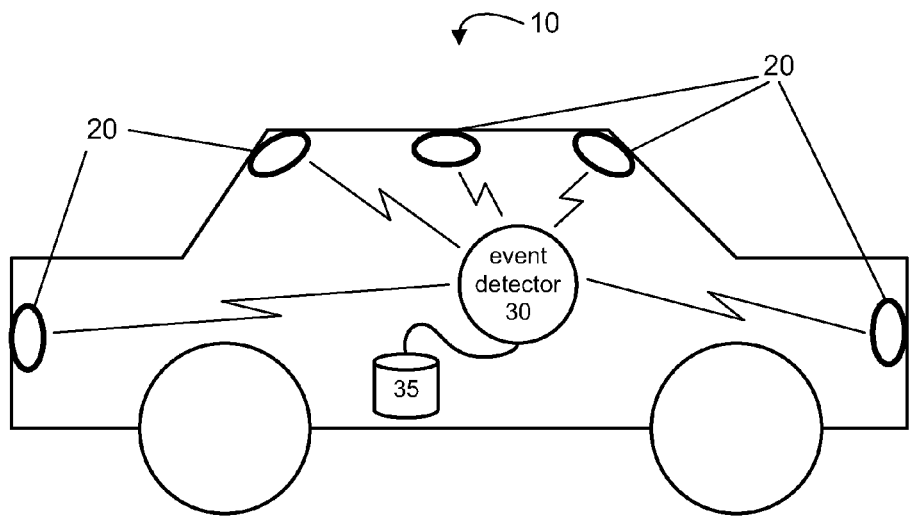
FIG. 1 is a block diagram illustrating an example event detector in control of a plurality of event capture devices deployed in a vehicle according to an embodiment of the present invention.

FIG. 1 is a block diagram illustrating an example event detector 30 in control of a plurality of event capture devices 20 deployed in a vehicle 10 according to an embodiment of the present invention. In the illustrated embodiment, the event detector 30 is integrated with the vehicle 10 and is communicatively coupled with the event capture devices 20. The event detector 30 is also configured with data storage 35.

The event detector 30 can be any of a variety of types of computing devices with the ability to execute programmed instructions, receive input from various sensors, and communicate with one or more internal or external event capture devices 20 and other external devices (not shown). An example general purpose computing device that may be employed as all or a portion of an event detector 30 is later described with respect to FIG. 17. An example general purpose wireless communication device that may be employed as all or a portion of an event detector 30 is later described with respect to FIG. 16.

When the event detector 30 identifies an event, the event detector 30 instructs the one or more event capture devices 20 to record pre-event data, during the event data, and post-event data that is then provided to the event detector 30 and stored in the data storage area 35. Events may comprise a variety of situations, including automobile accidents, reckless driving, rough driving, or any other type of stationary or moving occurrence that the owner of a vehicle 10 may desire to know about.

The vehicle 10 may have a plurality of event capture devices placed in various locations around the vehicle 10. An event capture device 20 may comprise a video camera, still camera, microphone, and other types of data capture devices. For example, an event capture device 20 may include an accelerometer that senses changes in speed or direction. Additional sensors and/or data capture devices may also be incorporated into an event capture device 20 in order to provide a rich set of information about a detected event.

The data storage area 35 can be any sort of internal or external, fixed or removable memory device and may include both persistent and volatile memories. The function of the data storage area 35 is to maintain data for long term storage and also to provide efficient and fast access to instructions for applications or modules that are executed by the event capture device 30.

In one embodiment, event detector 30 in combination with the one or more event capture devices 20 identifies an event and stores certain audio and video data along with related information about the event. For example, related information may include the speed of the vehicle when the event occurred, the direction the vehicle was traveling, the location of the vehicle (e.g., from a global positioning system ("GPS") sensor), and other information from sensors located in and around the vehicle or from the vehicle itself (e.g., from a data bus integral to the vehicle such as an on board diagnostic ("OBD") vehicle bus). This combination of audio, video, and other data is compiled into an event that can be stored in data storage 35 onboard the vehicle for later delivery to an evaluation server.

Figure 2:
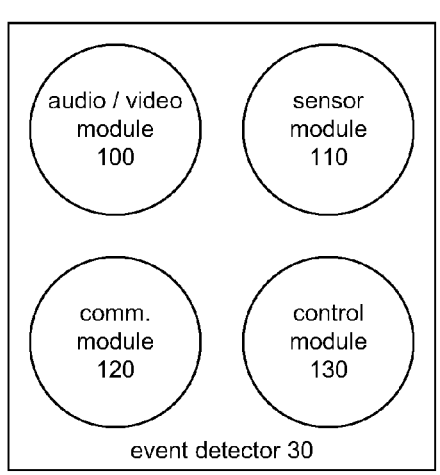
FIG. 2 is a block diagram illustrating an example event detector according to an embodiment of the present invention.

FIG. 2 is a block diagram illustrating an example event detector 30 according to an embodiment of the present invention. In the illustrated embodiment, the event detector 30 comprises an audio/video ("AV") module 100, a sensor module 110, a communication module 120, and a control module 130. Additional modules may also be employed to carry out the various functions of the event detector 30, as will be understood by those having skill in the art.

The AV module 100 is configured to manage the audio and video input from one or more event capture devices and storage of the audio and video input. The sensor module 110 is configured to manage one or more sensors that can be integral to the event detector 30 or external from the event detector 30. For example, an accelerometer may be integral to the event detector 30 or it may be located elsewhere in the vehicle. The sensor module 110 may also manage other types of sensor devices such as a GPS sensor, temperature sensor, moisture sensor, or the like (all not shown).

The communication module 120 is configured to manage communications between the event detector 30 and other devices and modules. For example, the communication module 120 may handle communications between the event detector 30 and the various event capture devices. The communication module 120 may also handle communications between the event detector 30 and a memory device, a docking station, or a server such as an evaluation server. The communication module 120 is configured to communicate with these various types of devices and other types of devices via a direct wire link (e.g., USB cable, firewire cable), a direct wireless link (e.g., infared, Bluetooth, ZigBee), or a wired or any wireless network link such as a local area network ("LAN"), a wireless network such as an IEEE 802.16 ("WiFi") network, a WiMAX network, satellite network, or a cellular network.

The control module 130 is configured to control the actions or remote devices such as the one or more event capture devices. For example, the control module 130 may be configured to instruct the event capture devices to capture an event and return the data to the event detector when it is informed by the sensor module 110 that certain trigger criteria have been met that identify an event.

Figure 3:
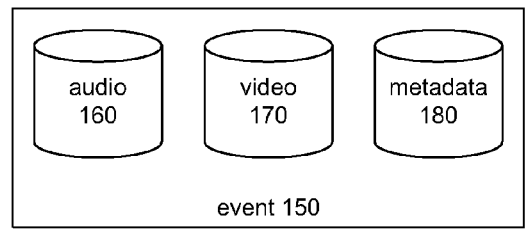
FIG. 3 is a block diagram illustrating an example event according to an embodiment of the present invention.

FIG. 3 is a block diagram illustrating an example event 150 according to an embodiment of the present invention. In the illustrated embodiment, the event 150 comprises audio data 160, video data 170, and metadata 180. The audio data 160 can be collected from inside the vehicle, outside the vehicle, and may include information from an internal vehicle bus about the baseline noise level of the operating vehicle, if such information is available. Additional information about baseline noise level, radio noise level, conversation noise level, or external noise level may also be included in audio data 160.

Video data 170 may include still images or moving video captured by one or more cameras in various locations in and around the vehicle. Video data 170 may include images or video from inside the vehicle, outside the vehicle, or both. In one particularly advantageous embodiment, still images and moving video that illustrate the entire area inside the vehicle and the entire 360 degree area surrounding the vehicle are captured by a plurality of image capture devices and included in video data 170.

Metadata 180 may include a variety of additional information that is available to the event detector 30 at the time of an event. Such additional data may include, but is not limited to, the velocity and direction of the vehicle, the GPS location of the vehicle, elevation, time, temperature, and vehicle engine and electrical component information, status of vehicle lights and signals, brake operation and position, throttle position, etc. captured from an internal vehicle bus, just to name a few. Additional information may also be included such as the number of occupants in the vehicle, whether seatbelts were fastened, whether airbags deployed, whether evasive maneuvering was attempted as determined by the route of the vehicle prior to the event. The specific identification of the driver may also be included, for example as read by the event detector from a radio frequency identification ("RFID") badge worn by the driver or integrated with a vehicle key assigned to the driver. As will be understood by those skilled in the art, metadata 180 may include an extremely rich variety of information limited only by the scope and type of information obtained prior to, during, and after an event.

Figure 4A:
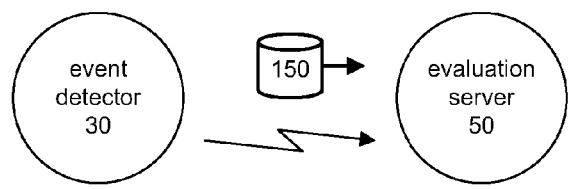
FIG. 4A is a block diagram illustrating an example event traveling from an event detector to an evaluation server according to an embodiment of the present invention.

FIG. 4A is a block diagram illustrating an example event 150 traveling from an event detector 30 to an evaluation server 50 according to an embodiment of the present invention. In one embodiment, events such as event 150 are captured by an event detector 30 and stored locally until they are provided to the evaluation server 50. The means by which an event 150 can be provided to the evaluation server 50 can vary. In various embodiments (or in a single embodiment), an event 150 may be provided from event detector 30 to evaluation server 50 by way of a portable media device, a direct wire link, a direct wireless link, an indirect wire link, an indirect wireless link, or any combination of these. Event 150 may be secured by encryption of the event 150 data structure and/or a secure channel between the event detector 30 and the evaluation server 50.

For example, a portable media device may include a USB drive, compact disc, thumb drive, media card, or other similar type of device. A direct wire link may include a USB cable, a firewire cable, an RS-232 cable, or the like. A direct wireless link may include an infrared link, a Bluetooth link, ZigBee link, or an IEEE 802.11 point-to-point link, a WiMAX link, or a cellular link, just to name a few. An indirect wired link may include a packet switched or circuit switched network connection configured for conveyance of data traffic. An Ethernet network connection is an example of a packet switched indirect wired link and a dial up modem connection is an example of a circuit switched indirect wired link, both of which may be configured for conveyance of data traffic.

Figure 4B:
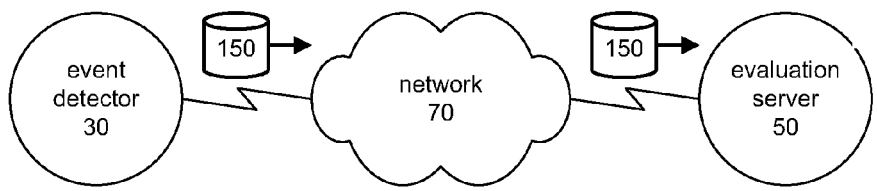
FIGS. 4B-4D are network diagrams illustrating example routes for an event traveling from an event detector to an evaluation server according to various embodiments of the present invention.
Figure 4C:
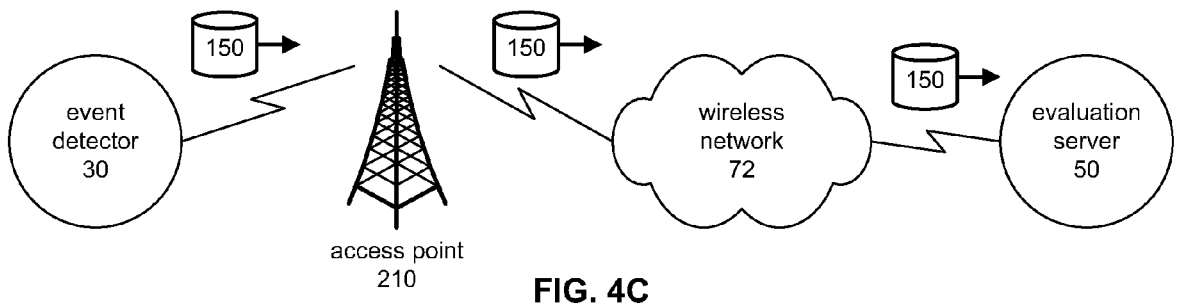
Figure 4D:
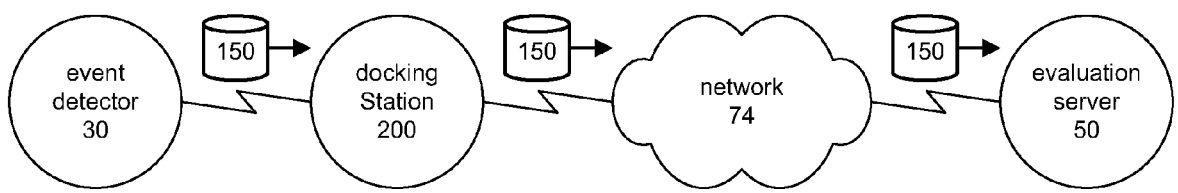

The following FIGS. 4B-4D illustrate various embodiments for providing events to an evaluation server.

FIG. 4B is a network diagram illustrating an example route for an event 150 traveling from an event detector 30 to an evaluation server 50 according to an embodiment of the present invention. In the illustrated embodiment, the event 150 travels over a network 70 from the event detector 30 to the evaluation server 50. The network 70 may comprise any of a variety of network types and topologies and any combination of such types and topologies. For example, the network 70 may comprise a plurality of networks including private, public, circuit switched, packet switched, personal area networks ("PAN"), local area networks ("LAN"), wide area networks ("WAN"), metropolitan area networks ("MAN"), satellite networks, or any combination of the these. Network 70 may also include that particular combination of networks ubiquitously known as the Internet.

FIG. 4C is a network diagram illustrating an example route for an event 150 traveling from an event detector 30 to an evaluation server 50 according to an embodiment of the present invention. In the illustrated embodiment, the event 150 travels to a wireless network 72 by way of an access point 210 and then on to the evaluation server 50 via the wireless network 72. The access point 210 may provide access via many different wireless network protocols as will be well understood by those having skill in the art. The wireless network 72 may be a WWAN or a WiFi network. The link between the event detector 30 and the access point 210 may be a short range direct link or a wide range direct link. The access point 210 may be a large radio tower device or a small in-home wireless appliance. The wireless network 72 may include over the air segments and also wired segments. For example, the last mile segments of wireless network 72 may be over the air while internal and back end segments may be wired segments. In one embodiment, the wireless network 72 may provide a wireless interface to the event detector 30 and then have a wired interface on the back end to the Internet, which in turn connects the evaluation server 50.

FIG. 4D is a network diagram illustrating an example route for an event 150 traveling from an event detector 30 to an evaluation server 50 according to an embodiment of the present invention. In the illustrated embodiment, a docking station 200 is disposed between the event detector and the network 74. In such an embodiment, an event 150 may be provided from the event detector 30 to the docking station 200 via a variety of means as described above, including portable media, direct wired or wireless link, and indirect wired or wireless link. The event detector 30 may also be physically coupled with the docking station 200 to convey the event 150 from the event detector 30 to the docking station 200. Once the event 150 is received by the docking station 200, the event is then sent over the network 74 to the evaluation server 50. In the illustrated embodiment, the network 74 may be a wired or wireless network or a combination of the two. The network 74 may also be private or public in whole or in part and may also include the Internet.

Figure 5:
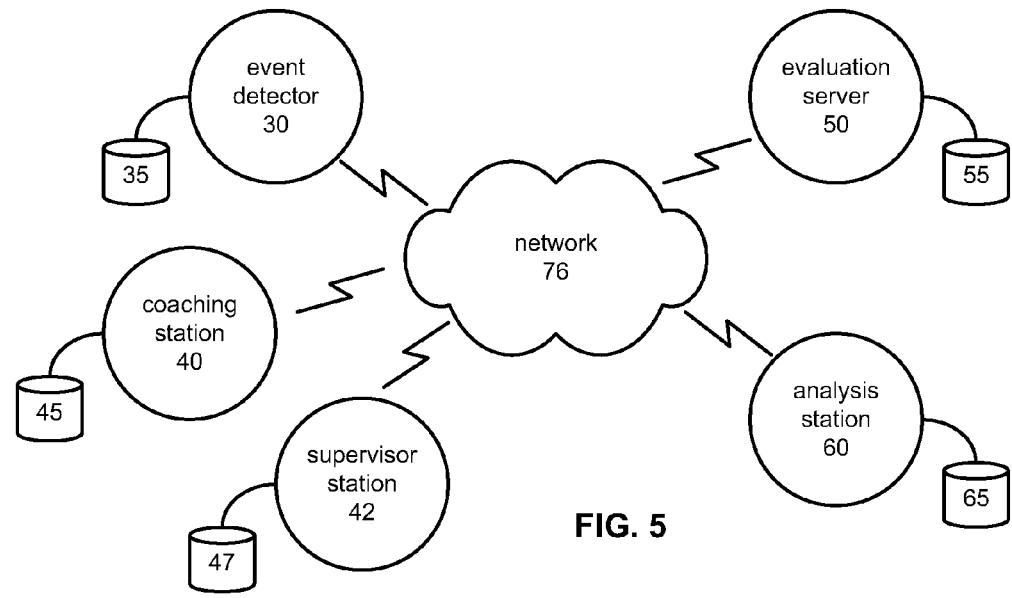
FIG. 5 is a network diagram illustrating an example system for reducing driving risk according to an embodiment of the present invention.

FIG. 5 is a network diagram illustrating an example system for driver improvement according to an embodiment of the present invention. In the illustrated embodiment, the system includes an event detector 30, a coaching station 40, a supervisor station 42, an evaluation server 50, and an analysis station 60, each coupled with a data storage area 35, 45, 47, 55, and 65, respectively. Additional event detectors 30, coaching stations 40, supervisor stations 42, evaluation servers 50, and analysis stations 60 may also be included.

The function of the event detector 30 is to identify and capture a plurality of events and send a data structure representing the audio, video, and other data related to the event to the evaluation server 50. The evaluation server maintains the captured events and provides them to the analysis station 60 where the events are reviewed. The analysis station 60 may be configured with certain hardware and software modules that allow an operator to review event data (e.g., audio, video, and metadata) in order to make an analysis related to the event and create summary reports and the like.

After an event is reviewed, it may be discarded, incorporated into a coaching session, flagged for follow up, flagged for inclusion in one or more reports, or otherwise maintained for later coaching, reporting, or analysis. In one embodiment, certain portions of one or more events may be incorporated into a report or a coaching session and then sent back to the evaluation server 50 for storage.

The coaching station 40 is configured to play coaching sessions to a particular driver in order to educate the driver about his or her risky driving behavior and suggest alternative driving techniques that the driver may employ to reduce such risky behavior. The coaching station 40 can access coaching sessions from the evaluation server 50 via the network 76 to view the coaching session. The supervisor station 42 is configured to allow executives, managers, and supervisors to access reports on the evaluation server over network 76 and view coaching sessions and reports regarding driver behavior. In one embodiment, a conventional web browser utility can be used at either the coaching station 40 or the supervisor station 42 to view both reports and coaching stations, thereby making either device a coaching station or a supervisor station based on the type of information that is accessed from the evaluation server.

Figure 6:
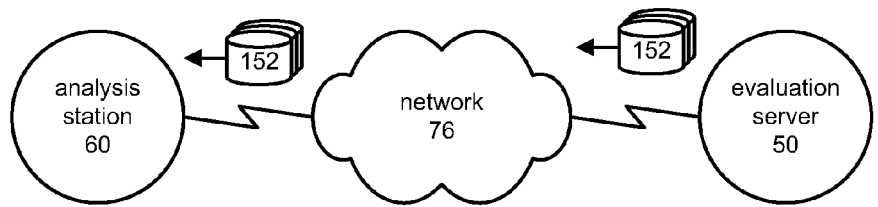
FIG. 6 is a network diagram illustrating an example route for a group of events traveling from an evaluation server to an analysis station according to an embodiment of the present invention.

FIG. 6 is a network diagram illustrating an example route for a group of events 152 traveling from an evaluation server to an analysis station according to an embodiment of the present invention. In the illustrated embodiment, the group of events 152 is provided by the evaluation server 50 to the analysis station 60 via the network 76. On the evaluation server, the group of events 152 may be identified by searching for all events that pertain to a particular driver. This may be accomplished by associating each event at the time it is captured with a particular driver. For example, the driver of a vehicle may have a unique identifier and that unique identifier may be included as part of the metadata for each event that is captured while that driver is operating the vehicle. In one embodiment, the driver identifier may be obtained by the event detector by reading an infrared identification device, perhaps incorporated into the driver's identification badge or by receiving the identifier as input when the driver begins the shift, or by reading the identifier from a media card or other wired or wireless device associated with the driver.

Groups of events 152 may also be identified by all events associated with a particular company, a particular shift, a particular supervisor, or other reporting structure or working structure combinations. Such a group of events 152, once provided to the analysis station 60 can then be analyzed by an operator that reviews each event to identify those events that need to be reported or shown to the driver, for example as part of a coaching station.

Figure 7:
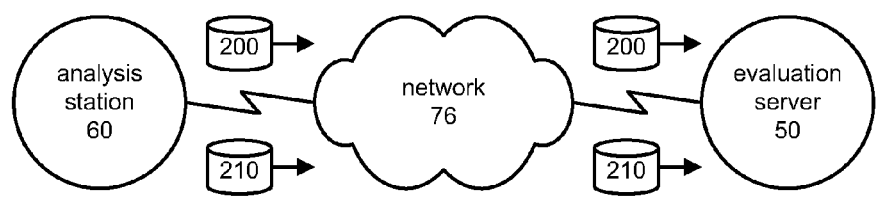
FIG. 7 is a network diagram illustrating an example route for a coaching session and an event report traveling from an analysis station to an evaluation sever according to an embodiment of the present invention.

FIG. 7 is a network diagram illustrating an example route for a coaching session 200 and an event report 210 traveling from an analysis station 60 to an evaluation server 50 according to an embodiment of the present invention. In the illustrated embodiment, an operator at the analysis station 60 may create a coaching session 200 that is made up of all or a portion of a plurality of events (audio, video, and metadata). The coaching session 200 may also include notes/comments from an operator who analyzed the event data or notes/comments from a supervisor or manager or executive. Such a coaching session 200 may be directed to an individual driver, a shift of drivers, or other classes of drivers for which the session may be beneficial (e.g., night time drivers, truck drivers, drivers of vehicles with trailers, etc.). The coaching session may also be directed to supervisors or managers or executives.

Additionally, the operator may also create a report 210 that is made up of summary information about all notable events. A notable event may be characterized as any event that the vehicle owner wants to know about. In one embodiment, there can be certain variable criteria that each vehicle owner can set in order to determine the risk level for events that are compiled into a report 210. Additionally, a report 210 may be created that includes information about all captured events, whether the event reflects a pothole or an automobile accident.

As shown in the illustrated embodiment, one or more coaching sessions 200 and reports 210 can be provided from the analysis station 60 to the evaluation server 50. These coaching sessions and reports can then be maintained at the evaluation server 50 for later viewing by executives, managers, supervisors, drivers, and the like. Such reports 210 and coaching sessions 200 can also be compiled onto a portable media such as a CD for viewing by new employees during orientation sessions.

Figure 8:
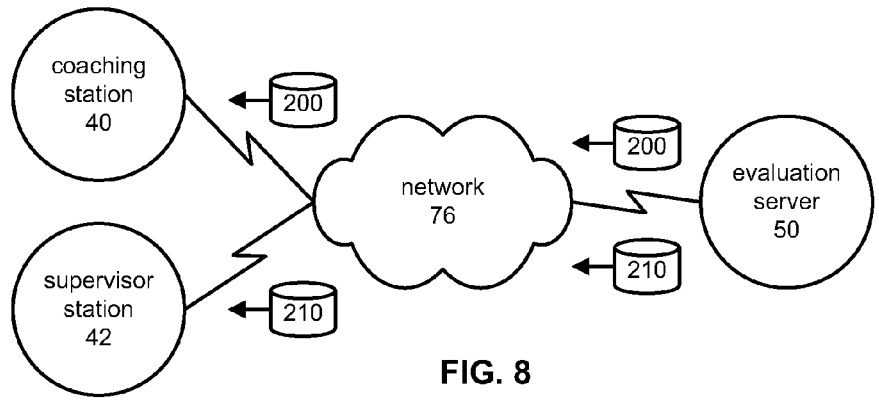
FIG. 8 is a network diagram illustrating an example route for a coaching session and an event report traveling from an evaluation sever to a coaching station and a supervisor station according to an embodiment of the present invention.

FIG. 8 is a network diagram illustrating an example route for a coaching session 200 and an event report 210 traveling form an evaluation server 50 to a coaching station 40 and supervisor station 42 according to an embodiment of the present invention. In the illustrated embodiment, the coaching session 200 and report 210 travel to one or more coaching stations 40 and supervisor stations 42 and the coaching session 200 goes to the coaching station 40, reports and coaching sessions can be sent to any remote device for review. In one embodiment, a conventional web browser utility can be used at a remote station to view both reports and coaching stations, thereby making the device both a coaching station and a supervisor station based on the type of information that is accessed from the evaluation server.

Figure 9:
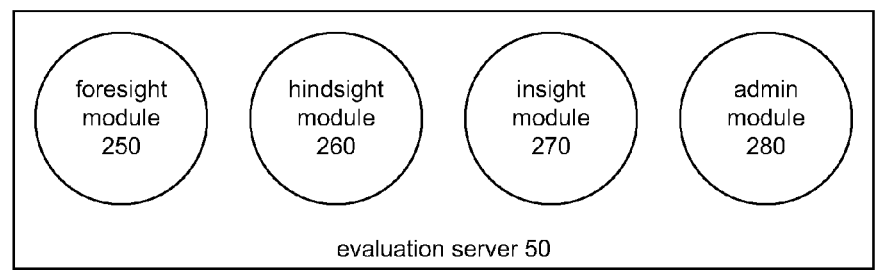
FIG. 9 is a block diagram illustrating an example evaluation server according to an embodiment of the present invention.

FIG. 9 is a block diagram illustrating an example evaluation server 50 according to an embodiment of the present invention. In the illustrated embodiment, the evaluation server 50 comprises a foresight module 250, a hindsight module 260, an insight module 270, and an administrative module 280.

The foresight module 250 is configured to monitor individual driver behavior and objectively score that behavior. The driver score is provided to executives and managers who can use that information to make informed decisions about behavior modification to eliminate or reduce risky behavior of an individual driver. Advantageously, reducing or eliminating risky behavior of a fleet of drivers may have a significant effect on the cost of insurance for the owner of the fleet of vehicles being driven.

The hindsight module 260 is configured to capture and store event data related to accidents, crashes, and other serious driving events in order to document for use by law enforcement in forensic analysis and insurance companies in coverage disputes. Advantageously, the captured event information provides a purely objective reconstruction of what happened prior to, during, and after an event.

The insight module 270 is configured to aggregate event data into a database of driving events and correlate information in the database to identify trends in driving behavior that relate to risk factors. For example, information about the vehicle and its various components, the driver and occupants, the driving conditions, the driving environment, and other useful data can be employed. The insight module 270 is additionally configured to correlate cause and effect relationships between data points and determine the effect of those relationships upon driver safety. The insight module 270 additionally compares these correlations and driver safety trends with historical event information for individual drivers to provide a driver rating or driver score for an individual driver. The driver score can be used by insurance companies to establish individualized insurance rates.

Figure 10:
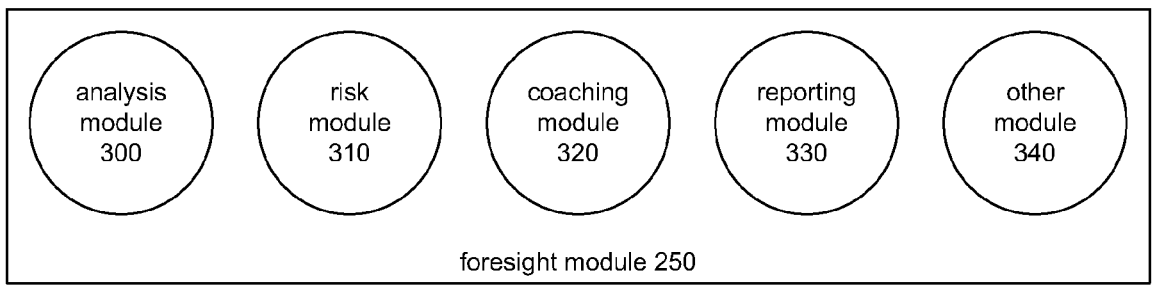
FIG. 10 is a block diagram illustrating an example foresight module according to an embodiment of the present invention.

FIG. 10 is a block diagram illustrating an example foresight module according to an embodiment of the present invention. In the illustrated embodiment, the foresight module 250 comprises an analysis module 300, a risk module 310, a coaching module 320, a reporting module 330, and an other module 340.

In one embodiment, the analysis module 300 is configured to analyze events. Analysis of events may include providing event data to an analysis station and receiving analysis results. Analysis of events may also include computerized analysis of event data. For example, computerized analysis of event data may be used to review audio, video, and metadata of an event to prioritize events for later analysis by an operator. Additional, more sophisticated computerized analysis of event data may also be employed to facilitate rapid and accurate analysis of events, as will be understood by those having skill in the art. Such uses may include, but are not limited to: review of audio data for interesting decibel changes, review of video data for interesting contrast between frames, and review of metadata for interesting gravity force ("g-force") changes.

Risk module 310 is configured to identify risky driving behaviors and assess risk associated with certain driving behaviors on a single event basis or in the aggregate. For example, risk module 310 may receive the results of an analysis of event data and then determine the risk associated with the driving behavior exhibited during the event. Risk module 310 may provide a risk assessment for a single event, for multiple events, for multiple events for a single driver, for multiple events for multiple drivers, and for the same type of event for multiple drivers. Advantageously, multiple event risk assessment can provide constructive feedback to drivers through coaching and reports to management identifying trends and important characteristics of individuals and groups.

Coaching module 320 is configured to facilitate the creation of coaching sessions and manage distribution and/or playback of coaching sessions, e.g., through multi-media file delivery or streaming. In one embodiment, coaching module 320 is configured to work cooperatively with an analysis station to create coaching sessions. For example, the coaching module 320 may provide the analysis session with certain event data to be included in a coaching session. Additionally, coaching module 320 may receive completed coaching sessions from the analysis station and store the coaching sessions for later review by individual drivers, groups of drivers, or managers, supervisors and executives.

The coaching module 320 may also manage the distribution and/or playback of coaching sessions. For example, the coaching module may provide a supervisor with a coaching session to review one or more of the drivers in a shift that is managed by the supervisor. The supervisor may then assign a review of the coaching session to an individual driver or a group of drivers. In an alternative embodiment, the supervisor may take a more interactive role and review specific events that have been identified and then select those events that should be included in a coaching session for an individual driver or a group of drivers. Various other levels of interactivity can also be employed.

Advantageously, the coaching module 320 facilitates creation and management of the review process for coaching sessions. As coaching sessions are created, in one embodiment, the coaching module 320 can keep track of what drivers, supervisors, managers, executives, and other users have reviewed the coaching session. This information may be used in the employee review process to encourage prompt review of coaching sessions by drivers. A beneficial result of the review of coaching sessions is that the driver becomes more aware of risky driving behavior and can thereafter use that increased awareness to avoid risky driving behavior and therefore reduce the amount of risk in driving.

Reporting module 330 is configured to compile reports based on individual and aggregate event data. Reports may be compiled for an individual driver, a particular shift, all day time drivers, all night time drivers, all twilight drivers (morning and evening), all drivers of particular vehicle types, and other groupings. These reports can be provided to supervisors, managers, and executives. The reports may also be provided to the individual drivers, for example, a report of the individual driver's events for the previous month, a report of a particularly significant individual event, etc. Advantageously, reports can be included as part of a coaching session to provide the viewer with concise summary data about the events in the coaching session.

In one embodiment, reports can be targeted for drivers, supervisors, managers, executives, public relations (e.g., reporters/press), insurance companies, government agencies, legal authorities, legal representatives and the like. The reports may be used for a variety of purposes, including supplemental coaching of drivers to emphasize the benefits of reducing risky driving behavior.

Additional functionality may also be included in the foresight module 250, as indicated by the other module 340. The other module 340 may be configured to perform a variety of tasks, including but not limited to: scoring individual drivers and groups of drivers based on aggregate event analysis over time; integration and assimilation of event data into a common data storage area; and mining of event data from the data storage area, just to name a few.

Figure 11:
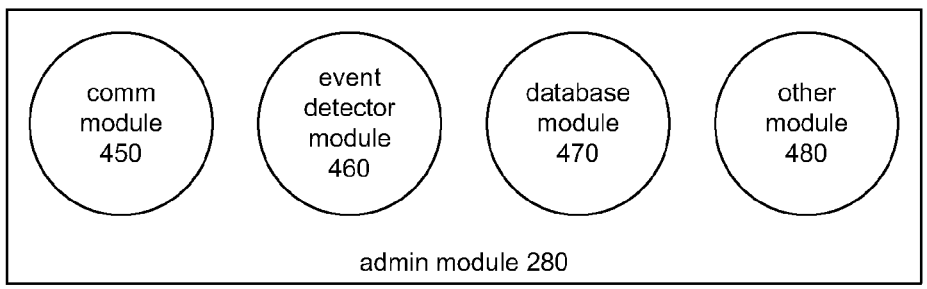
FIG. 11 is a block diagram illustrating an example administrative module according to an embodiment of the present invention.

FIG. 11 is a block diagram illustrating an example administrative module 280 according to an embodiment of the present invention. In the illustrated embodiment, the administrative module 280 comprises a communication module 450, an event detector module 460, a database module 470, and an other module 480.

In one embodiment, the communication module 450 is configured to manage communications between the evaluation server 50 and the various stations and event detectors that are part of the system for reducing driving risk. For example, the communication module 450 may manage communications with individual event detectors, analysis stations, coaching stations, supervisor stations, docking stations, and the like.

Additionally, communication module 450 may also manage communications between the various modules of the evaluation server 50. For example, communications between the foresight, hindsight, and insight modules may be managed by communication module 450. The communication module 450 is configured to manage wireless and wired communications and send and receive communications over a wired or wireless network.

The communication module 450 is configured to send and receive communications to and from an event detector device, either directly or indirectly. For example, communications with an event detector device may take place through a docking station or a server that aggregates event data from multiple event detector devices before sending the event data to the evaluation server.

The event detector module 460 is configured to manage individual and groups of event detectors. In one embodiment, the event detector module 460 may manage software versions that are resident on individual event detector devices so that the overall system may be kept up to date with respect to the versions of software deployed in the field.

Event detector module 460 may also track the individual event detectors that have provided event data or otherwise reported back to the evaluation server during a given time period. For example, event detector module 460 may track those event detectors that have reported in during each day and provide summary reports so that managers and supervisors can determine if event data from each vehicle in use is being sent to the evaluation server. In one embodiment, the event detector module 460 may attempt to contact an individual event detector in order to determine the status of the event detector. Advantageously, the evaluation server can determine the efficacy of the overall system by periodic confirmation of the status of each event detector. If the event detector module 460 determines that a particular event detector is not working properly, then that event detector may be identified as needing service or replacement.

Database module 470 is configured to manage a database of information related to reducing driving risk. For example, event data, coaching sessions, and reports can be maintained in a data storage area by database module 470. Additionally, related information from sources other than event detectors and analysis stations may also be managed by the database module 470. For example, weather information can be obtained from third party sources and stored to provide objective information about the weather conditions during a particular event. Additional information may also include traffic congestion information and smog/visibility information. Other beneficial information may also be included and managed by database module 470.

Additional functionality may also be included in the administrative module 280, as indicated by the other module 480. The other module 480 may be configured to perform a variety of tasks, including but not limited to: obtaining related information (e.g., road conditions, traffic conditions, weather, etc.), providing reports about event detector status, and tracking overall system performance and facilitating system maintenance when appropriate.

Figure 12:
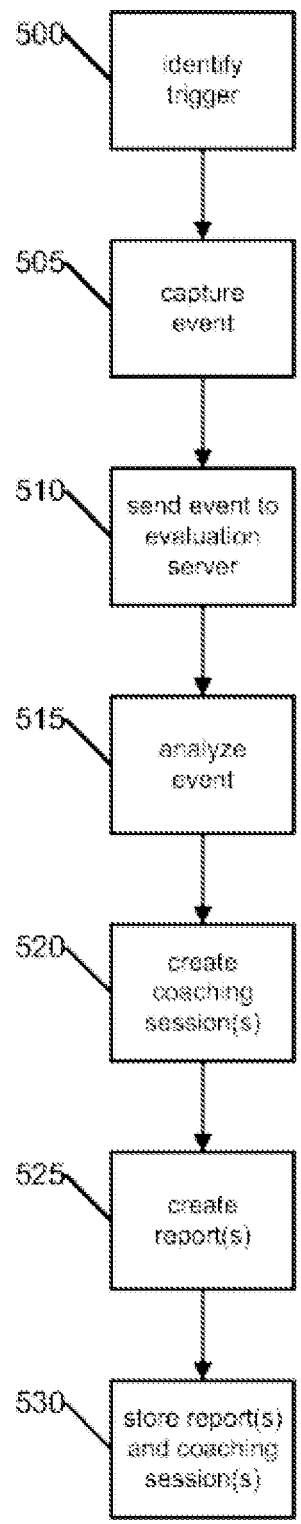
FIG. 12 is a flow diagram illustrating an example process for creating coaching sessions and event reports according to an embodiment of the present invention.

FIG. 12 is a flow diagram illustrating an example process for creating coaching sessions and event reports according to an embodiment of the present invention. The illustrated process can be carried out by a system for reducing driving risk such as that previously described with respect to FIG. 5. The process will be described with respect to a single event, but it should be understood that the process contemplates multiple events from multiple event detector devices as well as multiple evaluation servers.

Initially, in step 500 the event detector identifies a trigger event that causes an event to be captured, as shown in step 505. The captured event may include audio, video, and metadata that together provide information related to the time period immediately before the event, during the event, and immediately after the event. Once captured, the event is then sent to the evaluation server in step 510, for example via a wired or wireless network. The event may be initially downloaded to a docking station prior to transmission to the evaluation server, or it may be sent directly to the evaluation server. The event may be sent to the evaluation server via a direct or indirect wireless link or a direct or indirect wired link.

At the evaluation server, the event is stored in a data storage area where it can be co-located with other event data and related information. Next, in step 515 the event is analyzed. The analysis may be performed by an operator at a local or remote analysis station. In one embodiment, the analysis may also be performed at the evaluation server. Advantageously, the analysis may be performed by an experienced operator that can add value to the captured audio, video, and metadata that comprises the event.

After the analysis of the event, a coaching session can be created for the event, as shown in step 520. The coaching session may include audio, video, and metadata from the captured event data, other information such as weather or traffic information, other event information (e.g., from related events), notes/comments from the operator who evaluated the event and also notes/comments from others who have reviewed the event (e.g., a supervisor).

In addition to coaching sessions, certain reports may also be created, as shown in step 525. The reports may be aggregate reports about a plurality of events or they may be specific to a particular event, a particular driver, a particular group of drivers, shift of drivers, or class of drivers (e.g., night drivers). Reports may also be created for certain vehicle types or other groups based on certain characteristics. Other types of reports may also be created as requested by supervisors, managers, or executives as needed.

In step 530, the coaching sessions and reports that are created can be stored at the evaluation server for later delivery to supervisors, managers, executives, drivers, etc. Delivery may advantageously be electronic via a network or digital media device and can, for example, be accessed and viewed through a standard web browser. In certain situations, coaching sessions and/or reports can be delivered in hard copy, although coaching sessions with audio and video playback are preferably delivered electronically to provide a multimedia coaching session that will have greater impact and therefore greater retention by the recipient and greater reduction in risky driving behavior.

Figures 13, 14:
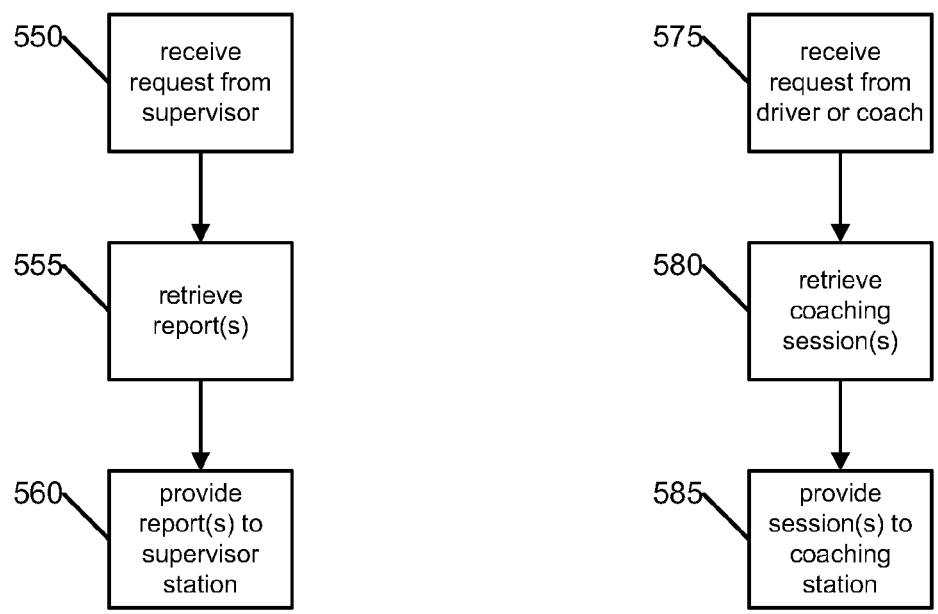
FIG. 13 is a flow diagram illustrating an example process for reducing driving risk through event reports according to an embodiment of the present invention.
FIG. 14 is a flow diagram illustrating an example process for reducing driving risk through coaching sessions according to an embodiment of the present invention.

FIG. 13 is a flow diagram illustrating an example process for reducing driving risk through event reports according to an embodiment of the present invention. The illustrated process can be carried out by a system for reducing driving risk such as that previously described with respect to FIG. 5. Initially, in step 550 a request to view one or more reports is received from a supervisor, manager, or executive. Identification of the requesting user and authorization of that user to view the requested report(s) can advantageously be performed to provide access control for the various reports and information that are generated at the evaluation server.

Upon receiving the request (and optionally authorizing the request) the evaluation server retrieves the corresponding report(s) in step 555. In one embodiment, the evaluation server may compile the report in real time in response to the request. Advantageously, such an embodiment allows for inclusion of the most up to date information in the generated report. Alternatively, certain reports may be pre-compiled so that delivery of such reports is achieved more quickly. For example, summary reports based on certain time periods (e.g., weekly, monthly, quarterly, etc.) can be created at the end of such a time period.

Next, in step 560 the report(s) are delivered to the requesting supervisor station. A report may be delivered in whole by sending a text or hypertext document, or a report may be delivered interactively through a standard web browser interface. Additionally, certain types of reports (e.g., summary reports based on certain time periods) may also be automatically delivered to predetermined recipients via hardcopy or electronic copy such as through email. In one embodiment the entire report can be delivered via email or the email may include a reference to the report so that the recipient can access the report through a standard web browser (which advantageously may also require the recipient to login and thereby authenticate receipt of sensitive information).

FIG. 14 is a flow diagram illustrating an example process for reducing driving risk through coaching sessions according to an embodiment of the present invention. The illustrated process can be carried out by a system for reducing driving risk such as that previously described with respect to FIG. 5. Initially, in step 575 a request to view one or more coaching sessions is received from a driver, coach, supervisor, manager, or executive. Identification of the requesting user and authorization of that user to view the requested coaching session(s) can advantageously be performed to provide access control for the various coaching session(s) that are provided by the evaluation server.

In one embodiment, the existence and readiness of the coaching session may be provided to the driver (or other) by way of an email notification that includes a reference. Execution or activation of the reference by the driver (or other) can then advantageously cause the request for the coaching session to be sent to the evaluation server. For example, the reference may be a hyper text transport protocol ("HTTP") link that points to the evaluation server.

Upon receiving the request (and optionally authorizing the request) the evaluation server retrieves the corresponding coaching session(s) in step 580. Advantageously, the coaching session(s) can be optimized so that delivery of such reports is achieved more quickly. For example, a coaching session may be compressed or otherwise optimized for network delivery. Typically, coaching sessions are created by an operator prior to delivery to a driver, coach, supervisor or other user. In one embodiment, however, coaching sessions may be created in real time based on the characteristics of the individual. For example, a driver who works the night shift may request a coaching session and the evaluation sever may compile a coaching session comprising safety tips for night time driving. The real time coaching session may also include individualized information based on the past driving events of the requesting driver.

Next, in step 585 coaching session(s) are delivered to the requesting coaching station. A coaching session may be delivered in whole by sending a multi-media or other type of electronic document, or a coaching session may be delivered interactively through a standard web browser interface, for example by streaming the coaching session from the evaluation server to the coaching station. Additionally, certain types of coaching session (e.g., standard sessions for general categories of recipients such as night time drivers) may also be automatically delivered to predetermined recipients, for example via electronic copy by mail. In some embodiment the entire coaching session can be delivered via email or the email may include a reference to the coaching session so that the recipient can access the coaching session through a standard web browser (which advantageously may also require the recipient to login).

Figure 15:
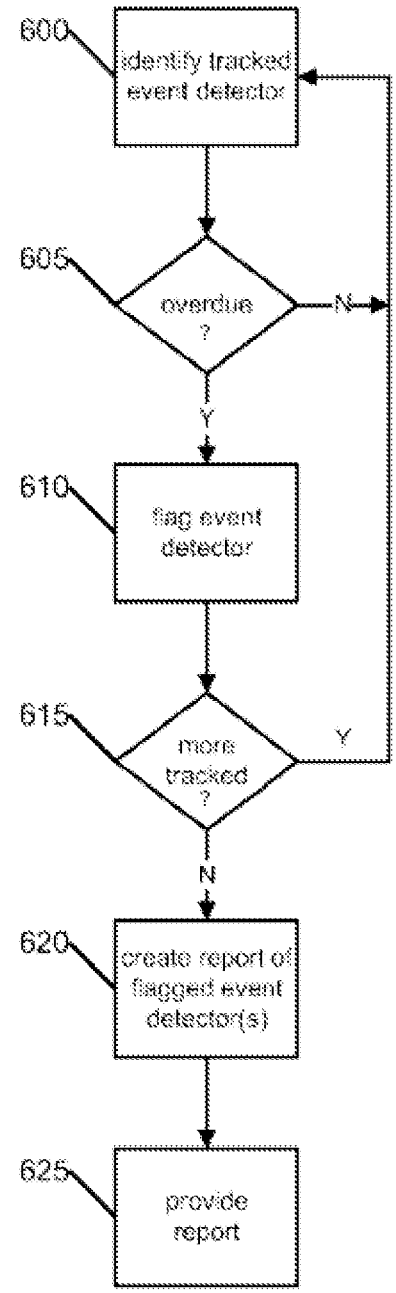
FIG. 15 is a flow diagram illustrating an example process for managing a plurality of event detectors according to an embodiment of the present invention.

FIG. 15 is a flow diagram illustrating an example process for managing a plurality of event detectors according to an embodiment of the present invention. The illustrated process can be carried out by an event detector module on an evaluation server such as that previously described with respect to FIG. 11. Initially, in step 600 the event detector module identifies an event detector being tracked. In one embodiment, event detectors may have certain identifiers that are used by the evaluation server to uniquely identify each of a plurality of event detectors. Such an identifier may be unique to the physical hardware of an event detector or unique to the network address for an event detector. The unique identifier may also be a combination of identifiers. For example, an event detector that is communicating with the evaluation server via a wired network may have an internet protocol ("IP") address that uniquely identifies the event detector. The event detector may also have a media access control ("MAC") address that uniquely identifies the event detector. Alternatively, an event detector that is communicating with the evaluation server via a wireless network may have a telephone number that uniquely identifies the event detector. Alternative identifiers or combinations of identifies may also be employed.

Once an event detector has been identified as an event detector being tracked, then in step 605, the event detector module determines if the status of the event detector is current. If the event detector status is current then the process loops back for management of additional event detectors being tracked. If the status of the event detector indicates that the event detector is overdue for checking in with the evaluation server (e.g., a shift has ended without receipt of event data from the event detector), the event detector module can identify the event detector as needing follow up, as shown in step 610. Next, if additional event detectors are to be tracked, as determined in step 615, then the process loops back to step 600 where the next event detector is identified.

If there are no more event detectors to be tracked, then a report of the event detectors needing follow up is generated in step 620 and the report is provided in step 625. In one embodiment, the report can be provided to a manager or supervisor for manual follow up. Advantageously, in another embodiment the report can be provided to a separate administrative module on the evaluation server for automated follow up. The automated follow up may include a status check request that is sent to the event detector electronically (e.g., via a wired or wireless network) to determine if the event detector is active and in communication with the evaluation server. The automated follow up may also include sending the target event detector an instruction to re-set itself or to provide a diagnostic report of its operation. Advantageously, the target event detector may be automatically interrogated by the evaluation server to provide more information about the status of the event detector and such additional information may be included in any report that is provided to a manager or supervisor, who may then arrange for service or replacement. Additionally, the automated follow up may also arrange for service or replacement depending on the results of the interrogation of the event detector.

Figure 16:
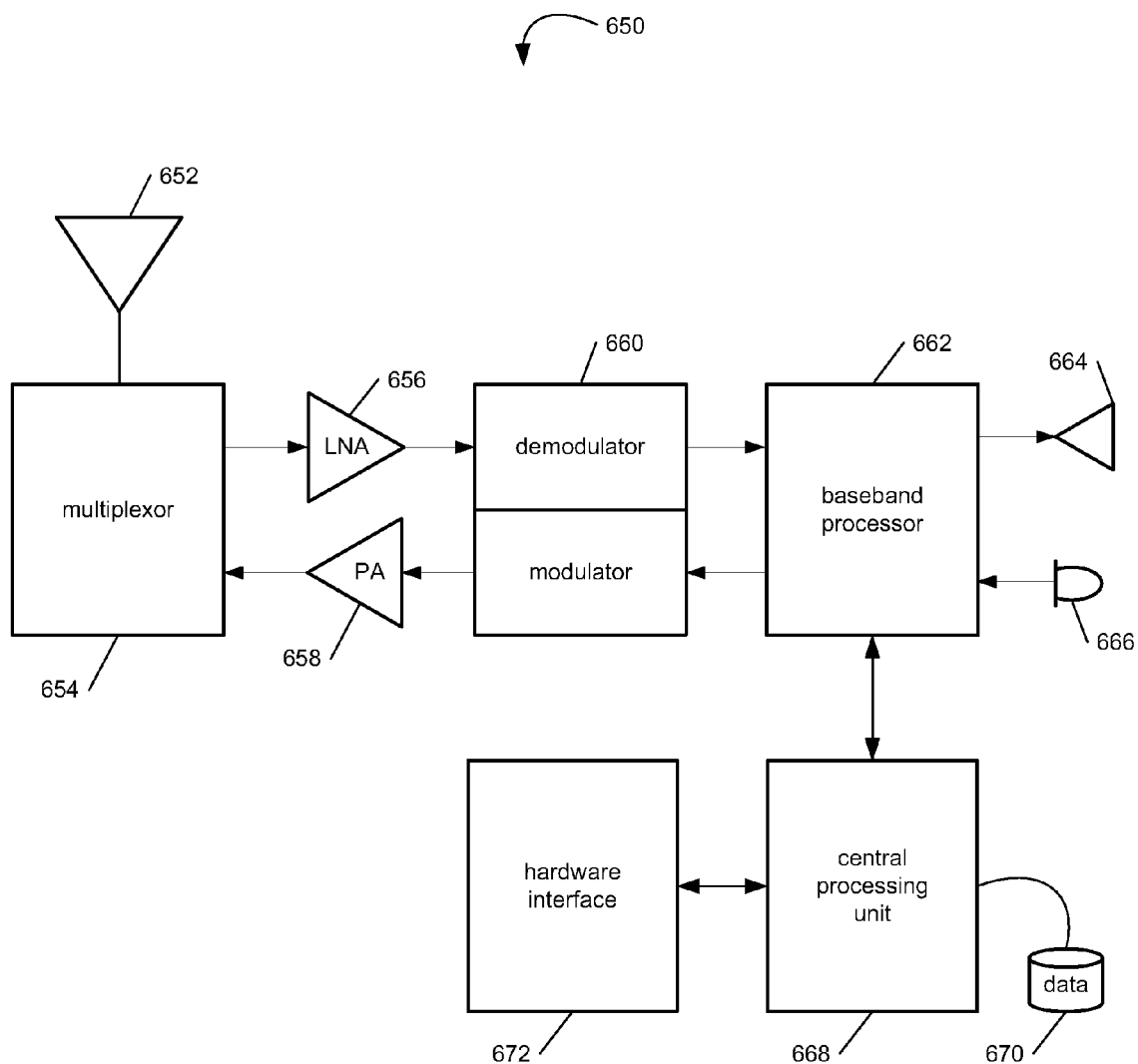
FIG. 16 is a block diagram illustrating an exemplary wireless communication device that may be used in connection with the various embodiments described herein.

FIG. 16 is a block diagram illustrating an exemplary wireless communication device 650 that may be used in connection with the various embodiments described herein. For example, the wireless communication device 650 may be used in conjunction with an event detector previously described with respect to FIG. 1, or an evaluation server, analysis station, coaching station, or supervisor station previously described with respect to FIG. 2. However, other wireless communication devices and/or architectures may also be used, as will be clear to those skilled in the art.

In the illustrated embodiment, wireless communication device 650 comprises an antenna 652, a multiplexor 654, a low noise amplifier ("LNA") 656, a power amplifier ("PA") 658, a modulation circuit 660, a baseband processor 662, a speaker 664, a microphone 666, a central processing unit ("CPU") 668, a data storage area 670, and a hardware interface 672. In the wireless communication device 650, radio frequency ("RF") signals are transmitted and received by antenna 652. Multiplexor 654 acts as a switch, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660.

Typically modulation circuit 660 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 662.

If the base-band receive audio signal contains audio information, then base-band processor 662 decodes the signal and converts it to an analog signal. Then the signal is amplified and sent to the speaker 664. The base-band processor 662 also receives analog audio signals from the microphone 666. These analog audio signals are converted to digital signals and encoded by the base-band processor 662. The base-band processor 662 also codes the digital signals for transmission and generates a base-band transmit audio signal that is routed to the modulator portion of modulation circuit 660. The modulator mixes the base-band transmit audio signal with an RF carrier signal generating an RF transmit signal that is routed to the power amplifier 658. The power amplifier 658 amplifies the RF transmit signal and routes it to the multiplexor 654 where the signal is switched to the antenna port for transmission by antenna 652.

The baseband processor 662 is also communicatively coupled with the central processing unit 668. The central processing unit 668 has access to a data storage area 670. The central processing unit 668 is preferably configured to execute instructions (i.e., computer programs or software) that can be stored in the data storage area 670. Computer programs can also be received from the baseband processor 662 and stored in the data storage area 670 or executed upon receipt. Such computer programs, when executed, enable the wireless communication device 650 to perform the various functions of the present invention as previously described.

In this description, the term "computer readable medium" is used to refer to any media used to provide executable instructions (e.g., software and computer programs) to the wireless communication device 650 for execution by the central processing unit 668. Examples of these media include the data storage area 670, microphone 666 (via the baseband processor 662), antenna 652 (also via the baseband processor 662), and hardware interface 672. These computer readable mediums are means for providing executable code, programming instructions, and software to the wireless communication device 650. The executable code, programming instructions, and software, when executed by the central processing unit 668, preferably cause the central processing unit 668 to perform the inventive features and functions previously described herein.

The central processing unit is also preferably configured to receive notifications from the hardware interface 672 when new devices are detected by the hardware interface. Hardware interface 672 can be a combination electromechanical detector with controlling software that communicates with the CPU 668 and interacts with new devices.

Figure 17:
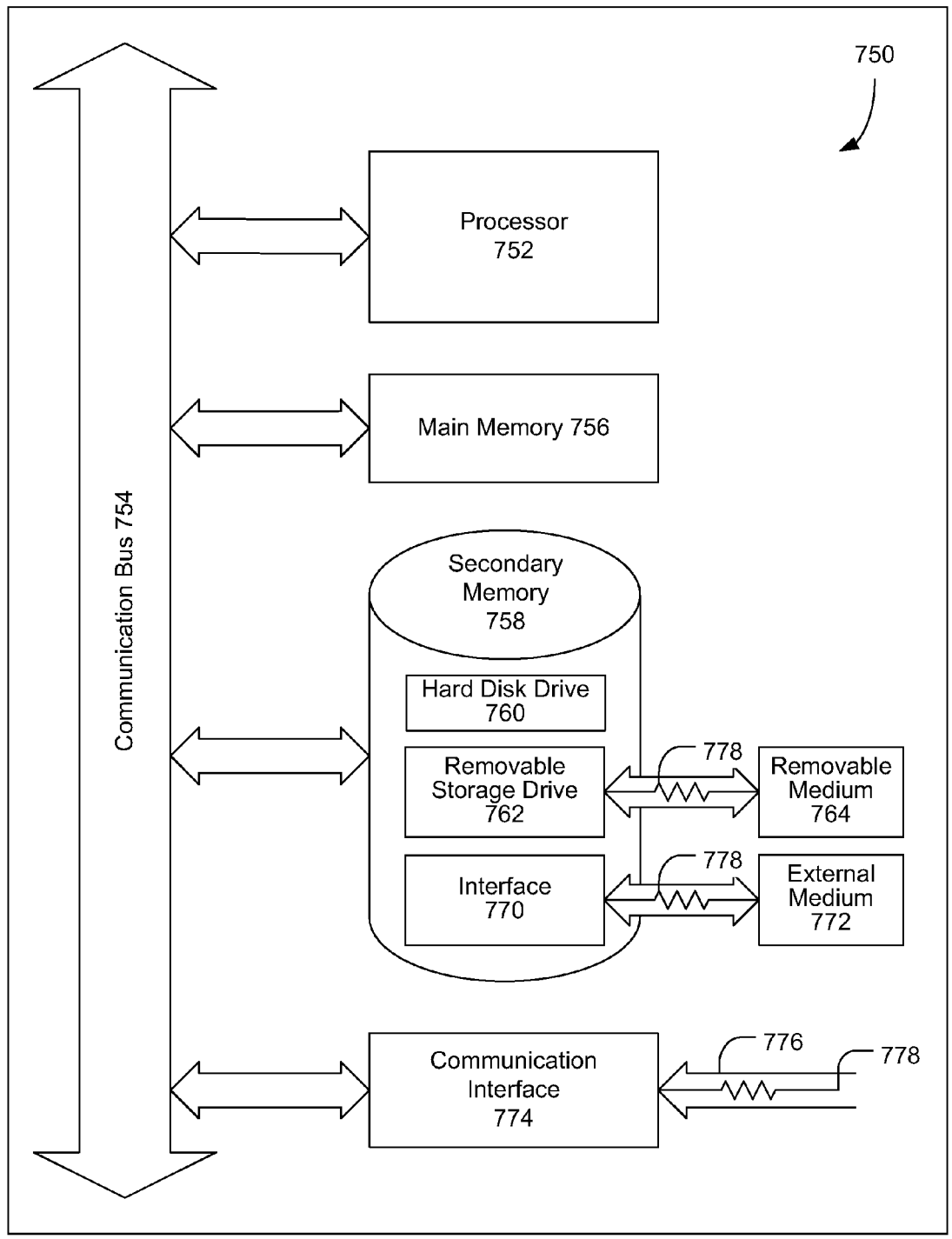
FIG. 17 is a block diagram illustrating an exemplary computer system as may be used in connection with various embodiments described herein.

FIG. 17 is a block diagram illustrating an exemplary computer system 750 that may be used in connection with the various embodiments described herein. For example, the computer system 750 may be used in conjunction with an event detector previously described with respect to FIG. 1, or an evaluation server, analysis station, coaching station, or supervisor station previously described with respect to FIG. 2. However, other computer systems and/or architectures may be used, as will be clear to those skilled in the art.

The computer system 750 preferably includes one or more processors, such as processor 752. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 752.

The processor 752 is preferably connected to a communication bus 754. The communication bus 754 may include a data channel for facilitating information transfer between storage and other peripheral components of the computer system 750. The communication bus 754 further may provide a set of signals used for communication with the processor 752, including a data bus, address bus, and control bus (not shown). The communication bus 754 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, mini PCI express, or standards promulgated by the Institute of Electrical and Electronics Engineers ("IEEE") including IEEE 488 general-purpose interface bus ("GPIB"), IEEE 696/S-100, and the like.

Computer system 750 preferably includes a main memory 756 and may also include a secondary memory 758. The main memory 756 provides storage of instructions and data for programs executing on the processor 752. The main memory 756 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 758 may optionally include a hard disk drive 760 and/or a removable storage drive 762, for example a floppy disk drive, a magnetic tape drive, a compact disc ("CD") drive, a digital versatile disc ("DVD") drive, etc. The removable storage drive 762 reads from and/or writes to a removable storage medium 764 in a well-known manner. Removable storage medium 764 may be, for example, a floppy disk, magnetic tape, CD, DVD, memory stick, USB memory device, etc.

The removable storage medium 764 is preferably a computer readable medium having stored thereon computer executable code (i.e., software) and/or data. The computer software or data stored on the removable storage medium 764 is read into the computer system 750 as electrical communication signals 778.

In alternative embodiments, secondary memory 758 may include other similar means for allowing computer programs or other data or instructions to be loaded into the computer system 750. Such means may include, for example, an external storage medium 772 and an interface 770. Examples of external storage medium 772 may include an external hard disk drive or an external optical drive, or and external magneto-optical drive.

Other examples of secondary memory 758 may include semiconductor-based memory such as programmable read-only memory ("PROM"), erasable programmable read-only memory ("EPROM"), electrically erasable read-only memory ("EEPROM"), or flash memory. Also included are any other removable storage units 772 and interfaces 770, which allow software and data to be transferred from the removable storage unit 772 to the computer system 750.

Computer system 750 may also include a communication interface 774. The communication interface 774 allows software and data to be transferred between computer system 750 and external devices (e.g. printers), networks, or information sources. For example, computer software or executable code may be transferred to computer system 750 from a network server via communication interface 774. Examples of communication interface 774 include a modem, a network interface card ("NIC"), a communications port, a PCMCIA slot and card, an infrared interface, and an IEEE 1394 fire-wire, just to name a few.

Communication interface 774 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 774 are generally in the form of electrical communication signals 778. These signals 778 are preferably provided to communication interface 774 via a communication channel 776. Communication channel 776 carries signals 778 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 756 and/or the secondary memory 758. Computer programs can also be received via communication interface 774 and stored in the main memory 756 and/or the secondary memory 758. Such computer programs, when executed, enable the computer system 750 to perform the various functions of the present invention as previously described.

In this description, the term "computer readable medium" is used to refer to any media used to provide computer executable code (e.g., software and computer programs) to the computer system 750. Examples of these media include main memory 756, secondary memory 758 (including hard disk drive 760, removable storage medium 764, and external storage medium 772), and any peripheral device communicatively coupled with communication interface 774 (including a network information server or other network device). These computer readable mediums are means for providing executable code, programming instructions, and software to the computer system 750.

In an embodiment that is implemented using software, the software may be stored on a computer readable medium and loaded into computer system 750 by way of removable storage drive 762, interface 770, or communication interface 774. In such an embodiment, the software is loaded into the computer system 750 in the form of electrical communication signals 778. The software, when executed by the processor 752, preferably causes the processor 752 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for reducing driving risk, comprising:
receiving driving event data captured using an event detector, wherein the driving event data is associated with a vehicle and a driver, wherein the driving event data is associated with a driving event;
analyzing, using one or more processors, the driving event data comprising:
aggregating the driving event data into a database of historic driving events,
correlating the driving event data with historic driving events in the database to identify trends in driving behavior of the driver that relate to risk factors, and
determining risk associated with the driving event data;
storing, using a memory, a coaching session comprising information related to reducing risky driving behavior, wherein the information includes at least a portion of the driving event data and the risk associated with the driving event data;
receiving an indication to associate the coaching session with the driver; and
providing the coaching session for review by the driver.

2. The method of claim 1, wherein the coaching session comprises audio data.

3. The method of claim 1, wherein the coaching session comprises video data.

4. The method of claim 1, wherein analyzing the driving event data includes analyzing audio data, video data, or metadata.

5. The method of claim 1, further comprising providing the coaching session to a supervisor of the driver.

6. The method of claim 1, further comprising combining an analysis of other driving event data from other driving events into the coaching session.

7. The method of claim 6, wherein the other driving event data is associated with a plurality of drivers.

8. The method of claim 6, wherein the other driving event data is related by being associated with a specific company.

9. The method of claim 6, wherein the other driving event data is related by being associated with a specific time of day.

10. The method of claim 6, wherein the other driving event data is related by being associated with a specific shift.

11. A system for reducing risk in driving, comprising:
an interface for receiving driving event data captured using an event detector, wherein the driving event data is associated with a vehicle and a driver, wherein the driving event data is associated with a driving event;
one or more processors configured to:
analyze the driving event data comprising:
aggregating the driving event data into a database of historic driving events,
correlating the driving event data with the historic driving events in the database to identify trends in driving behavior of the driver that relate to risk, and
determining risk associated with the driving event data;
store a coaching session comprising information related to reducing risky driving behavior, wherein the information includes at least a portion of the driving event data and the risk associated with the driving event data;
receive an indication to associate the coaching session with the driver;
provide the coaching session for review by the driver; and
one or more memories coupled with the one or more processors and configured to provide the one or more processors with instructions.

12. The system of claim 11, wherein the coaching session comprises audio data.

13. The system of claim 11, wherein the coaching session comprises video data.

14. The system of claim 11, wherein analyzing the driving event data includes analyzing audio data, video data, or metadata.

15. The system of claim 11, further comprising providing the coaching session to a supervisor of the driver.

16. The system of claim 11, further comprising combining an analysis of other driving event data from other driving events into the coaching session.

17. The system of claim 16, wherein the other driving event data is associated with a plurality of drivers.

18. The system of claim 16, wherein the other driving event data is related by being associated with a specific company.

19. The system of claim 16, wherein the other driving event data is related by being associated with a specific time of day.

20. The system of claim 16, wherein the other driving event data is related by being associated with a specific shift.

21. A computer program product for reducing driving risk, the computer program product being embodied in a non-transitory computer readable storage medium and comprising computer instructions for:
receiving driving event data captured using an event detector, wherein the driving event data is associated with a vehicle and a driver, wherein the driving event data is associated with a driving event;
analyzing the driving event data comprising:
aggregating the driving event data into a database of historic driving events,
correlating the driving event data with historic driving events in the database to identify trends in driving behavior of the driver that relate to risk,
determining a risk associated with the driving event data;
storing a coaching session comprising information related to reducing risky driving behavior, wherein the information includes at least a portion of the driving event data and the risk associated with the driving event data;
receiving an indication to associate the coaching session with the driver; provide the coaching session for review by the driver.

* * * * *